(12) United States Patent
Su

(10) Patent No.: US 11,174,983 B1
(45) Date of Patent: Nov. 16, 2021

(54) SUPPORT STAND STRUCTURE WITH QUICK-RELEASE WHEEL MECHANISM

(71) Applicant: SHUTTLE INC., Taipei (TW)

(72) Inventor: Kuan-Ming Su, Taipei (TW)

(73) Assignee: SHUTTLE INC., Taipei (TW)

( * ) Notice: Subject to any disclaimer, the term of this patent is extended or adjusted under 35 U.S.C. 154(b) by 0 days.

(21) Appl. No.: 17/170,546

(22) Filed: Feb. 8, 2021

(30) Foreign Application Priority Data

Jan. 6, 2021 (TW) .................................. 110200146

(51) Int. Cl.
| | |
|---|---|
| *F16M 11/04* | (2006.01) |
| *A47B 19/00* | (2006.01) |
| *F16M 11/42* | (2006.01) |
| *A47F 5/10* | (2006.01) |
| *A47F 5/04* | (2006.01) |
| *B60B 33/00* | (2006.01) |
| *F16M 13/00* | (2006.01) |
| *F16M 11/18* | (2006.01) |

(52) U.S. Cl.
CPC ............. *F16M 11/42* (2013.01); *A47F 5/04* (2013.01); *A47F 5/108* (2013.01); *B60B 33/0002* (2013.01); *F16M 11/04* (2013.01); *F16M 11/18* (2013.01); *F16M 13/00* (2013.01); *F16M 2200/08* (2013.01)

(58) Field of Classification Search
CPC ...... F16M 11/42; F16M 11/048; F16M 11/28; F16M 13/00; F16M 2200/066; F16M 2200/08; A47F 5/04; A47F 5/108; B60B 33/0002; A47B 23/042
See application file for complete search history.

(56) References Cited

U.S. PATENT DOCUMENTS

| | | | | |
|---|---|---|---|---|
| 5,878,518 | A * | 3/1999 | Grewe ................... | E01F 9/692 |
| | | | | 40/606.02 |
| 6,367,494 | B1 * | 4/2002 | Tung ................... | E04H 12/2238 |
| | | | | 135/44 |
| D470,305 | S * | 2/2003 | Clarke ............................ | D3/10 |
| 6,694,891 | B1 * | 2/2004 | Lai ...................... | A47B 3/0818 |
| | | | | 108/116 |
| 7,040,583 | B1 * | 5/2006 | Holland .................... | A47F 3/12 |
| | | | | 248/122.1 |
| 7,963,593 | B2 * | 6/2011 | Mitchell ................ | A47B 21/06 |
| | | | | 297/172 |
| 10,850,920 | B1 * | 12/2020 | Allen .................... | B65F 1/1473 |

FOREIGN PATENT DOCUMENTS

GB          2576864 A  *  11/2020

* cited by examiner

*Primary Examiner* — Tan Le
(74) *Attorney, Agent, or Firm* — Chun-Ming Shih; HDLS IPR Services

(57) ABSTRACT

The disclosure relates to a support stand structure with a quick-release wheel mechanism, which includes a stand, a detachable wheeled seat, and multiple fasteners. The stand includes a base. The base has multiple slots and a rear wall. The detachable wheeled seat includes a board and multiple wheels. The board has a front plate disposed above the base and a rear plate projecting over the rear wall. The front plate has multiple tabs extended downwardly and inserted in each slot. Each tab has a through hole. The wheels are mounted on a bottom of the rear plate. The fasteners are installed on a bottom of the base. Each fastener includes a movable pin. Each movable pin is attachable to and detachable from each through hole. Therefore, the support stand has the advantages of stability and saving space with detachable wheels.

10 Claims, 12 Drawing Sheets

SUPPORT STAND STRUCTURE WITH QUICK-RELEASE WHEEL MECHANISM

BACKGROUND OF THE DISCLOSURE

Technical Field

The disclosure relates to a support stand structure for installing a board, a kiosk or an all-in-one (AIO) PC, particular to a support stand structure with a quick-release wheel mechanism.

Related Art

With the flourishing development of the information technology, interactive kiosks and all-in-one PCs (AIO PCs) are applied in convenience stores, libraries, hotels, and hospitals to provide services, such as purchasing products, searching product information, searching library collection, providing hotel room key, transaction, etc.

However, when related-art kiosks or AIO PCs need to be moved, wheels are mounted under the machine or the support stand, and the structure has the problems of the machine being easily to slide, being difficult to position and the wheels occupying space. It is inconvenient in using.

In view of this, the inventors have devoted themselves to the above-mentioned related art, researched intensively and cooperated with the application of science to try to solve the above-mentioned problems. Finally, the disclosure which is reasonable and effective to overcome the above drawbacks is provided.

SUMMARY OF THE DISCLOSURE

The disclosure provides a support stand structure with a quick-release wheel mechanism. The support stand structure uses a detachable wheeled seat, which may be installed to or detached from the stand, to make the support stand structure have the advantages of stable positioning and saving space with detachable wheels.

In the embodiment of the disclosure, the disclosure provides a support stand structure with a quick-release wheel mechanism, which includes a stand having a base, and the base having multiple slots and a rear wall; a detachable wheeled seat including a board and multiple wheels, the board having a front plate disposed above the base and a rear plate projecting over the rear wall, the front plate having multiple tabs downwardly extended and inserted in each slot, each tab having a through hole, and the multiple wheels mounted on a bottom of the rear plate; and multiple fasteners installed on a bottom of the base, each fastener including a movable pin, and each movable pin attachable to and detachable from each through hole.

Accordingly, when a user pulls each movable pin toward the rear wall to make each movable pin detach from each through hole and withdraw each tab from each slot, the detachable wheeled seat may be rapidly removed from the base. Thus, the support stand structure may have the functions of the wheels being easily and rapidly to be assembled for rapidly moving the device.

Accordingly, the detachable wheeled seat may be installed when the stand needs to be moved and the detachable seat may be removed when the stand needs to be positioned. Therefore, the support stand structure has the advantages of stable positioning and saving space with detachable wheels.

DETAILED DESCRIPTION OF THE DISCLOSURE

Figure 1:
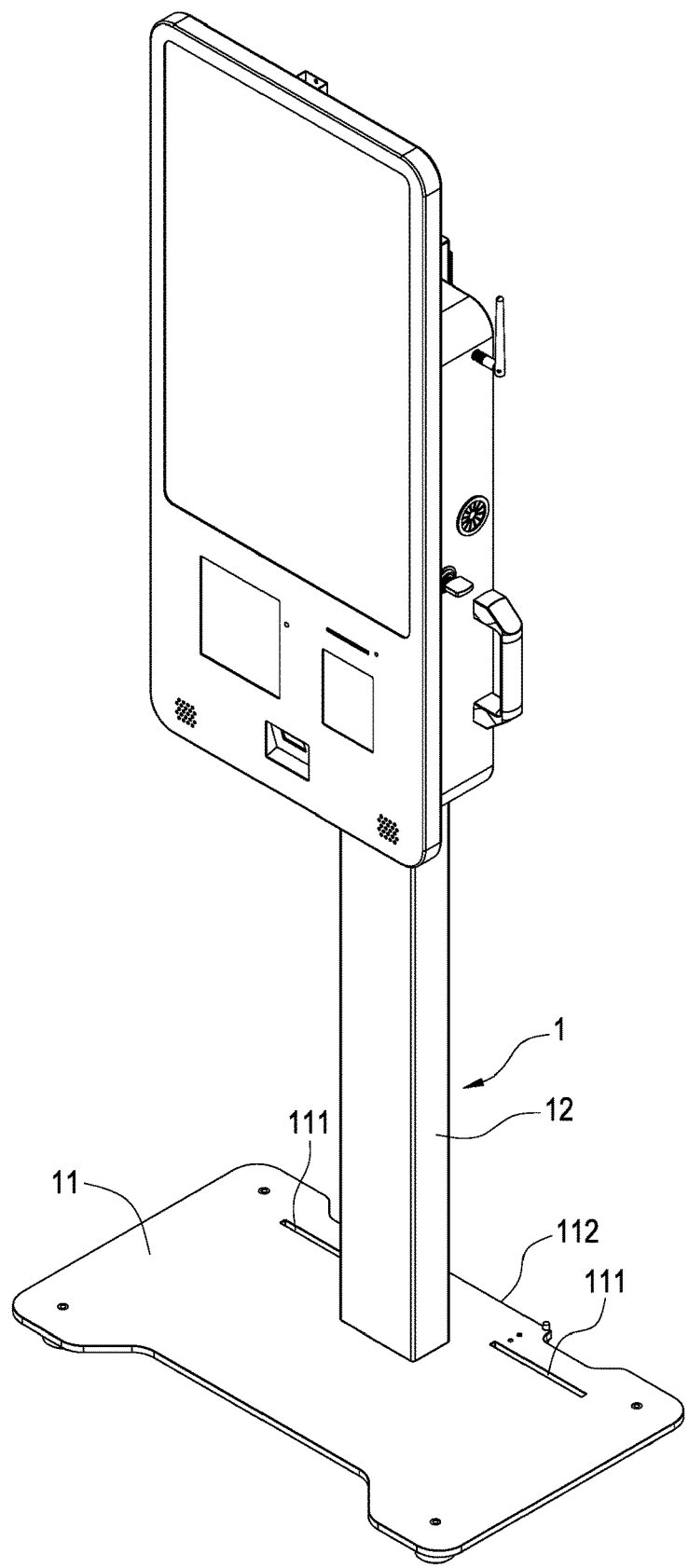
FIG. 1 is a perspective schematic view of the stand of the disclosure.
Figure 2:
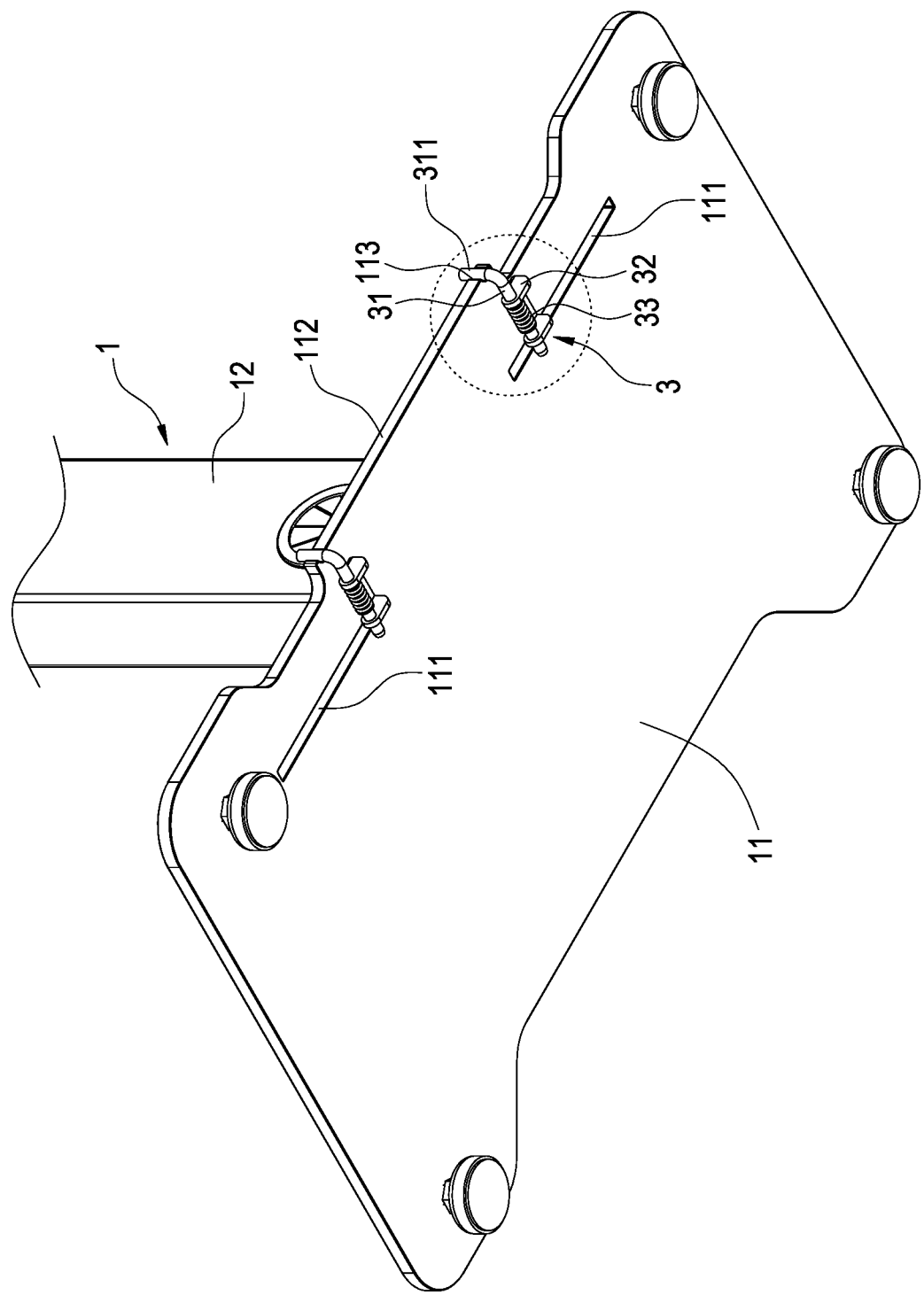
FIG. 2 is a partially enlarged view of the stand of the disclosure.
Figure 3:
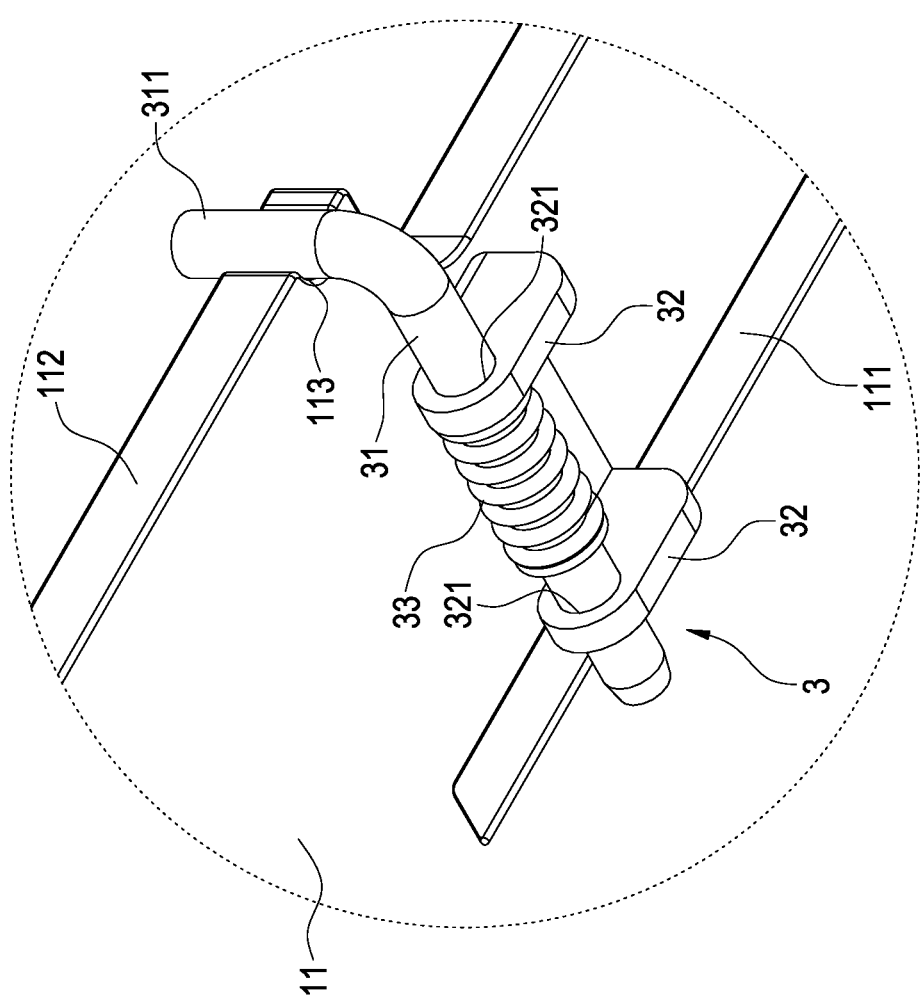
FIG. 3 is an enlarged view of the dotted line circle in FIG. 2.
Figure 4:
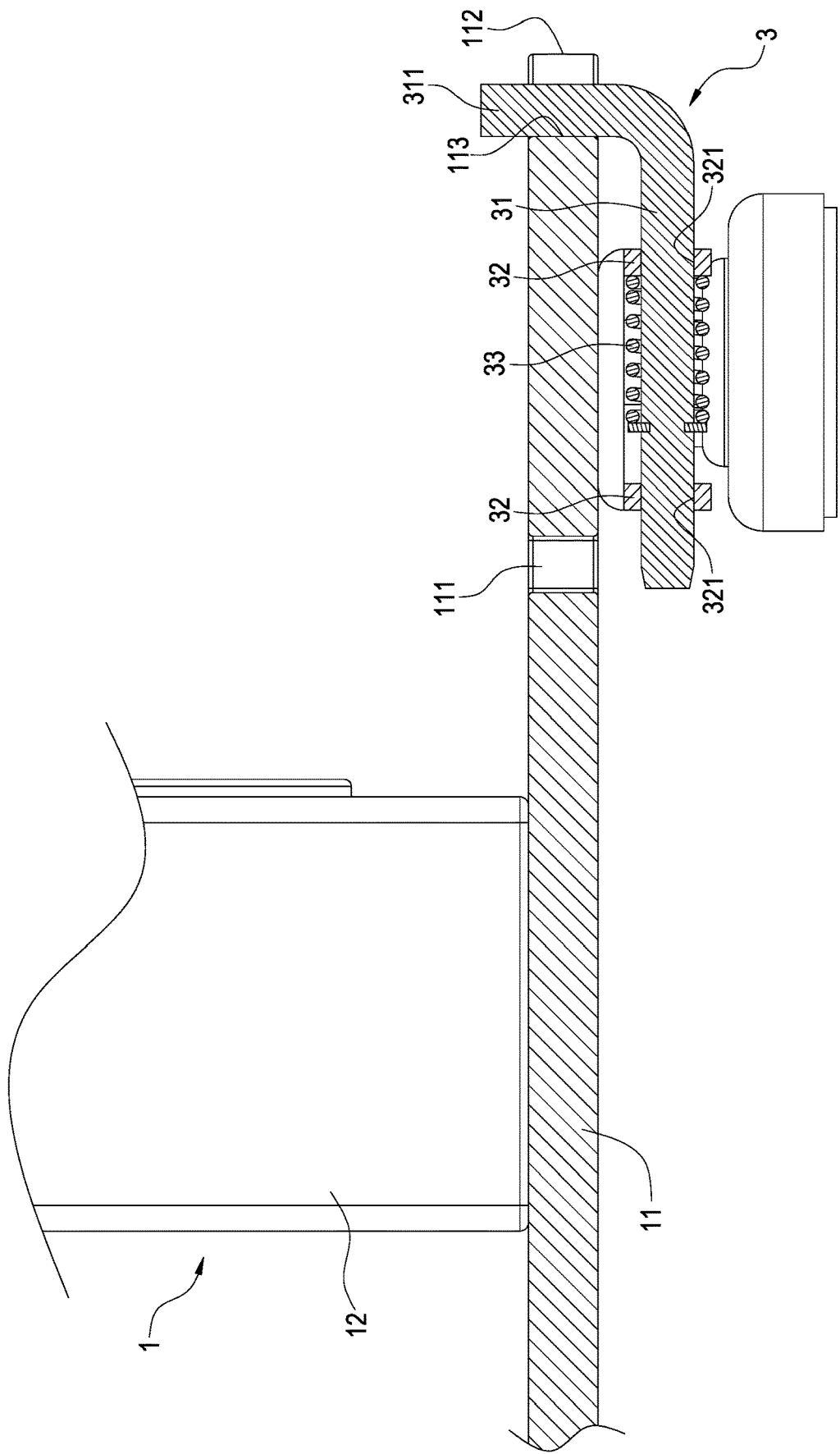
FIG. 4 is a partially cross-sectional view of the stand of the disclosure.
Figure 5:
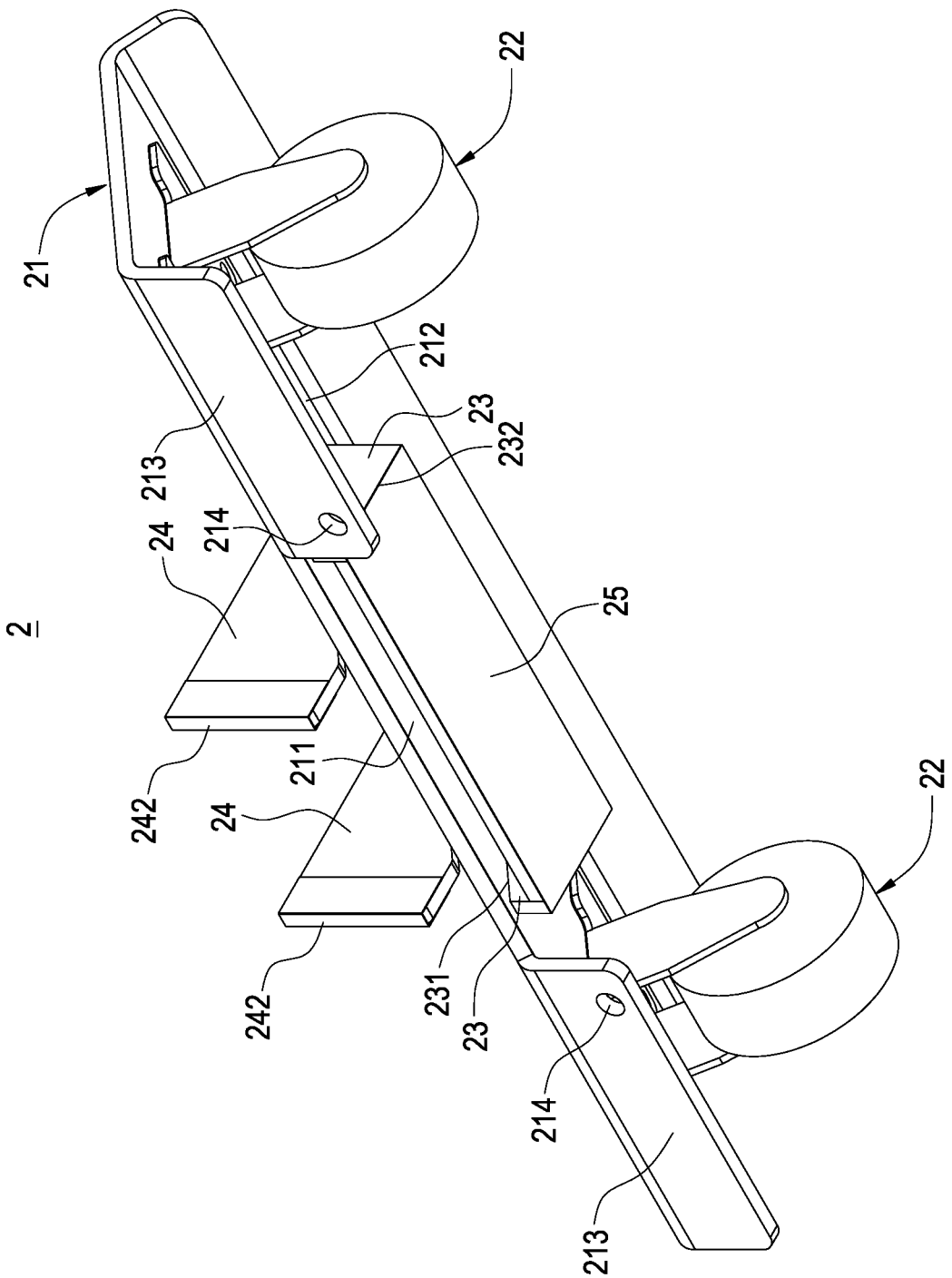
FIG. 5 is a perspective schematic view of the detachable wheeled seat of the disclosure.

To further disclose the features and technical contents of the disclosure, please refer to the following description and the drawings. However, the drawings are used for reference and description only, not for limitation to the disclosure.

Please refer to FIGS. 1-12. The disclosure provides a support stand structure with a quick-release wheel mechanism, which includes a stand 1, a detachable wheeled seat 2 and a plurality of fasteners 3.

As shown in FIGS. 1-4 and 6-12, the stand 1 includes a base 11 and a post 12. The base 11 is provided with a plurality of slots 111 and a rear wall 112. An end of the post 12 is connected to the top of the base 11 and the other end thereof is mounted with an equipment, such as, but not limited to, an interactive kiosk or an all-in-one PC (AIO PC), etc.

As shown in FIGS. 5-12, the detachable wheeled seat 2 includes a board 21 and a plurality of wheels 22. The board 21 has a front plate 211 disposed above the base 11 and a rear plate 212 projecting over the rear wall 112. The front plate 211 has a plurality of tabs 213 downwardly extended and each of the tabs 213 is inserted in respective slot 111. Each tab 213 has a through hole 214. The multiple wheels 22 are mounted on the bottom of the rear plate 212.

In detail, the board 21 has one or multiple lower blocks 23 downwardly extended and one or multiple upper blocks 24 upwardly extended. The one or multiple lower blocks 23 are sandwiched between the base 11 and the front plate 211. The one or multiple upper blocks 24 are sandwiched between the post 12 and the board 21.

In addition, in this embodiment, an amount of the lower block 23 is multiple. Each lower block 23 has a first slant edge 231 and a first horizontal edge 232 arranged correspondingly. Each first slant edge 231 is formed on the front plate 211 and each first horizontal edge 232 abuts against the base 11 to make the board 21 slant with respect to the base 11. Each lower block 23 may be, but not limited to, a triangular block or a trapezoidal block.

Moreover, a side of each of the lower blocks 23 away from the board 21 is extended to connect with each other to be a transversal rib 25. In other words, the support stand structure may further include the transversal rib 25 extended between sides of adjacent two of the lower blocks 23 away from the board 21. The bottom surface of the transversal rib 25 and each first horizontal edge 232 are coplanar and jointly abut against the base 11 to make the board 21 more stably mounted on the base 11.

Also, in this embodiment, an amount of the upper block 24 is multiple. Each upper block 24 has a second slant edge 241 and a second horizontal edge 242 arranged correspondingly. The second slant edge 241 is formed on the front plate 211 and the second horizontal edge 242 abuts against the post 12 to make the board 21 slant with respect to the post 12. Each upper block 24 may be, but not limited to, a triangular block or a trapezoidal block.

As shown in FIGS. 2-4 and 7-11, the multiple fasteners 3 are installed on the bottom of the base 11. Each fastener 3 includes a movable pin 31. Each movable pin 31 may be attachable to and detachable from each through hole 214.

In detail, each fastener 3 further includes two positioning blocks 32 and an elastic member 33. The two positioning blocks 32 are extended from the bottom of the base 11 and arranged between each slot 111 and the rear wall 112. Each positioning block 32 is provided with a passing hole 321. Each movable pin 31 is inserted into the passing holes 321 of the two positioning blocks 32. Each elastic member 33 is clipped and elastically supports between each movable pin 31 and one of the positioning blocks 32. Each elastic member 33 is used to bring each movable pin 31 to move and restore toward each slot 111.

In addition, an end of each movable pin 31 away from each slot 111 is extended with an L-shaped lever 311. The rear wall 112 is disposed with a plurality of indents 113. Each L-shaped lever 311 may be attachable to and detachable from each indent 113.

When each L-shaped lever 311 is detached from each indent 113, each movable pin 31 moves toward each slot 111 to be inserted into each through hole 214.

Figure 6:
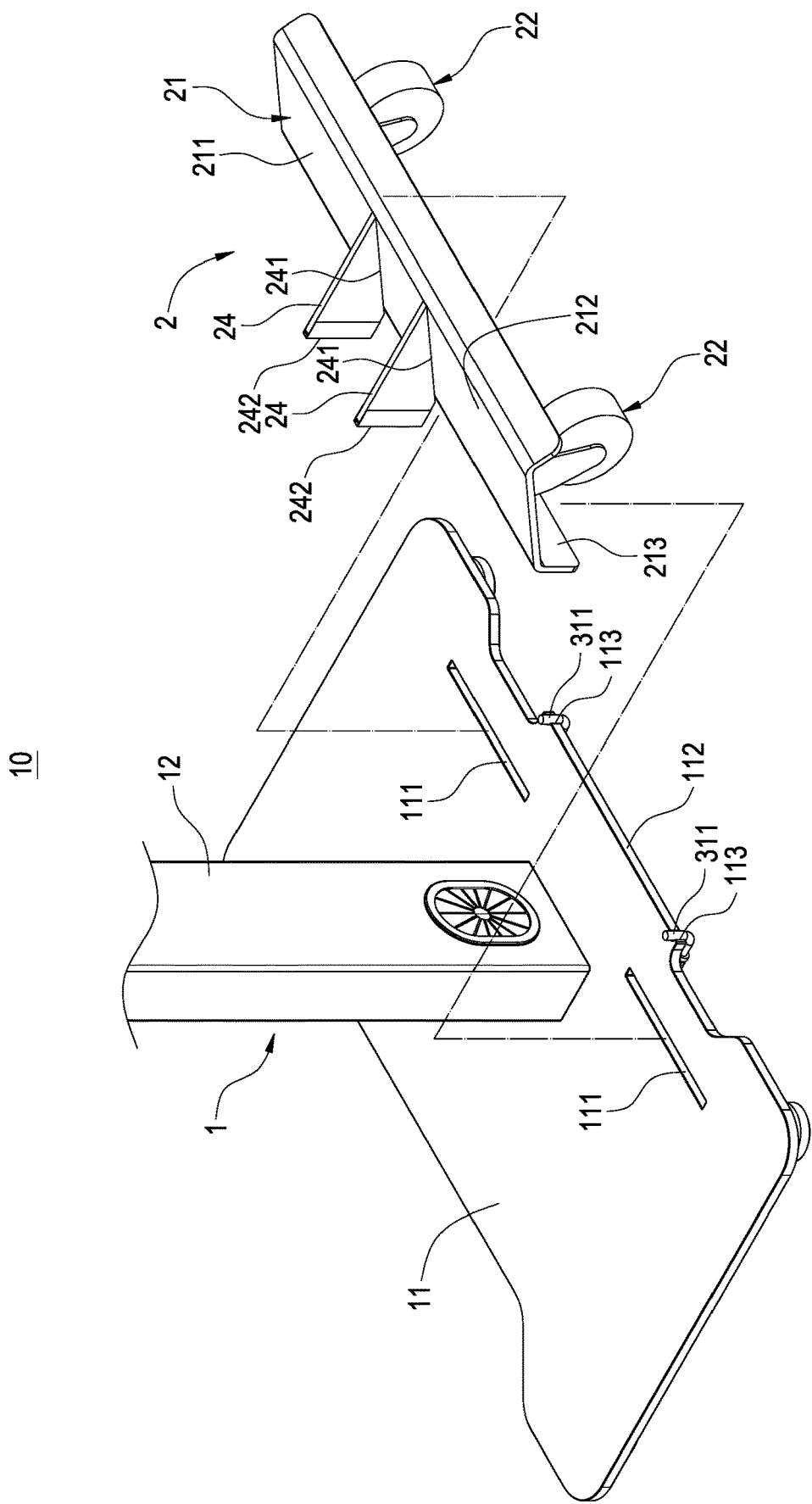
FIG. 6 is a partially exploded view of the support stand structure of the disclosure.
Figure 7:
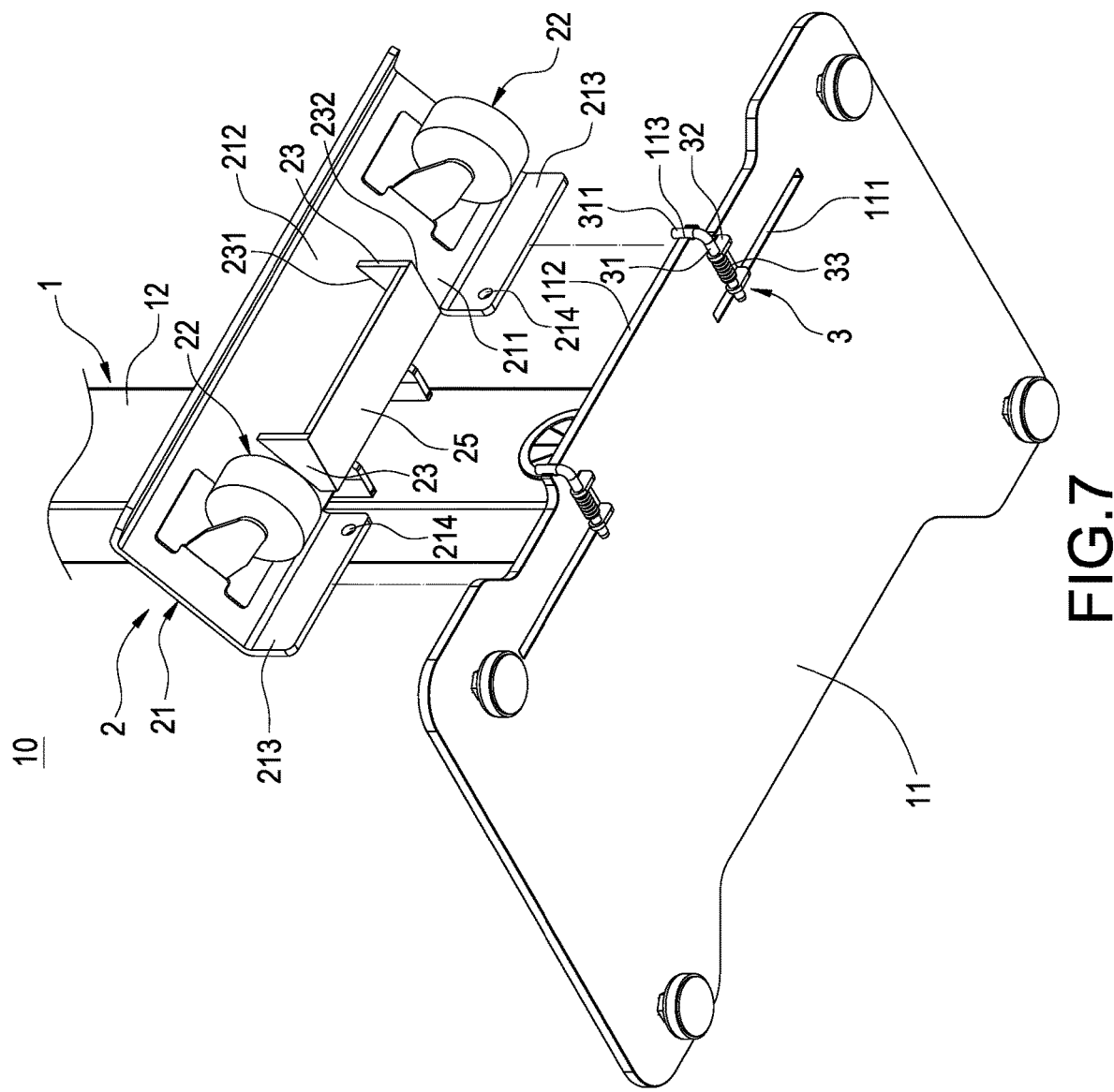
FIG. 7 is another partially exploded view of the support stand structure of the disclosure.
Figure 8:
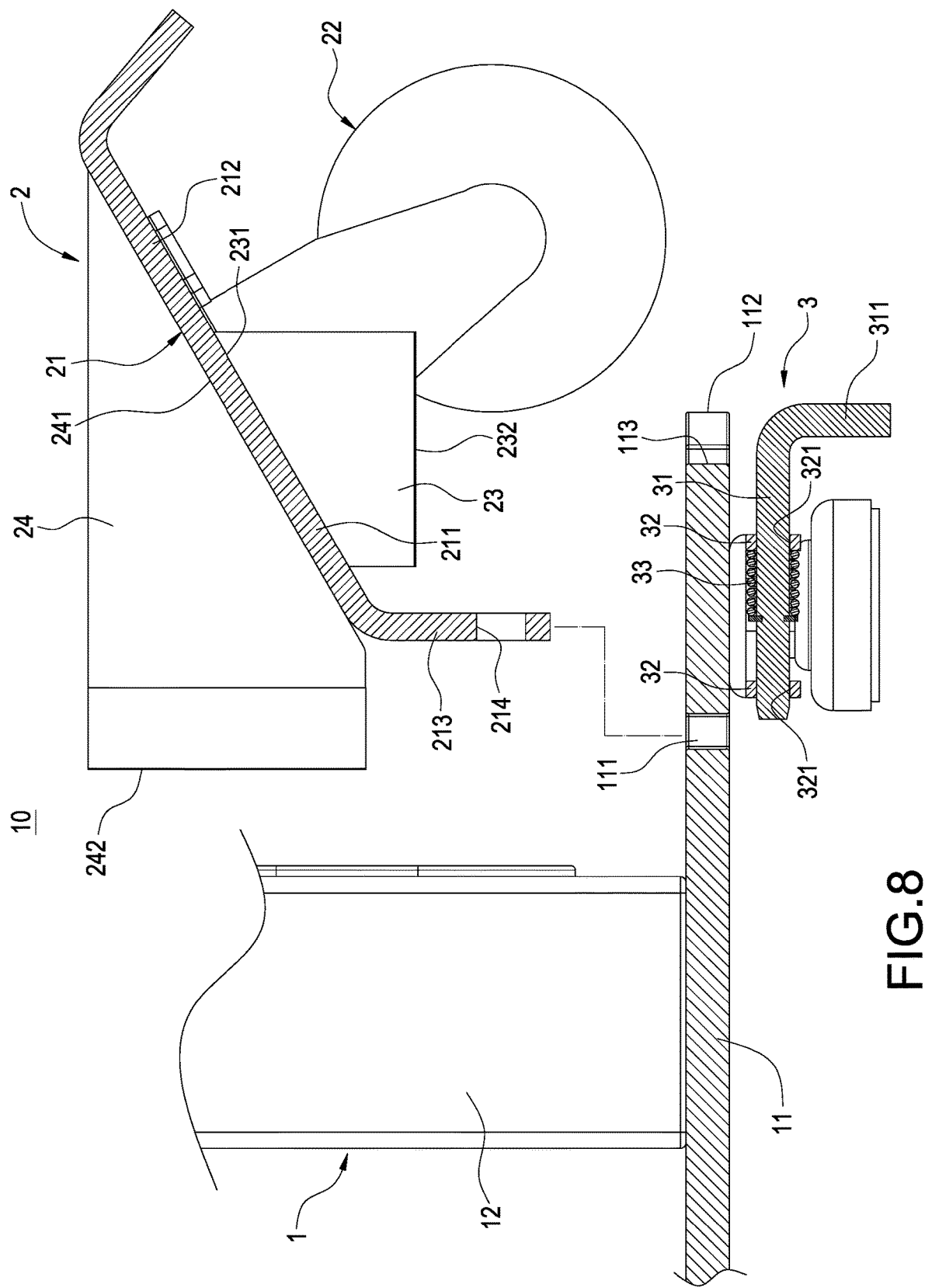
FIG. 8 is a partially cross-sectional exploded view of the support stand structure of the disclosure.
Figure 9:
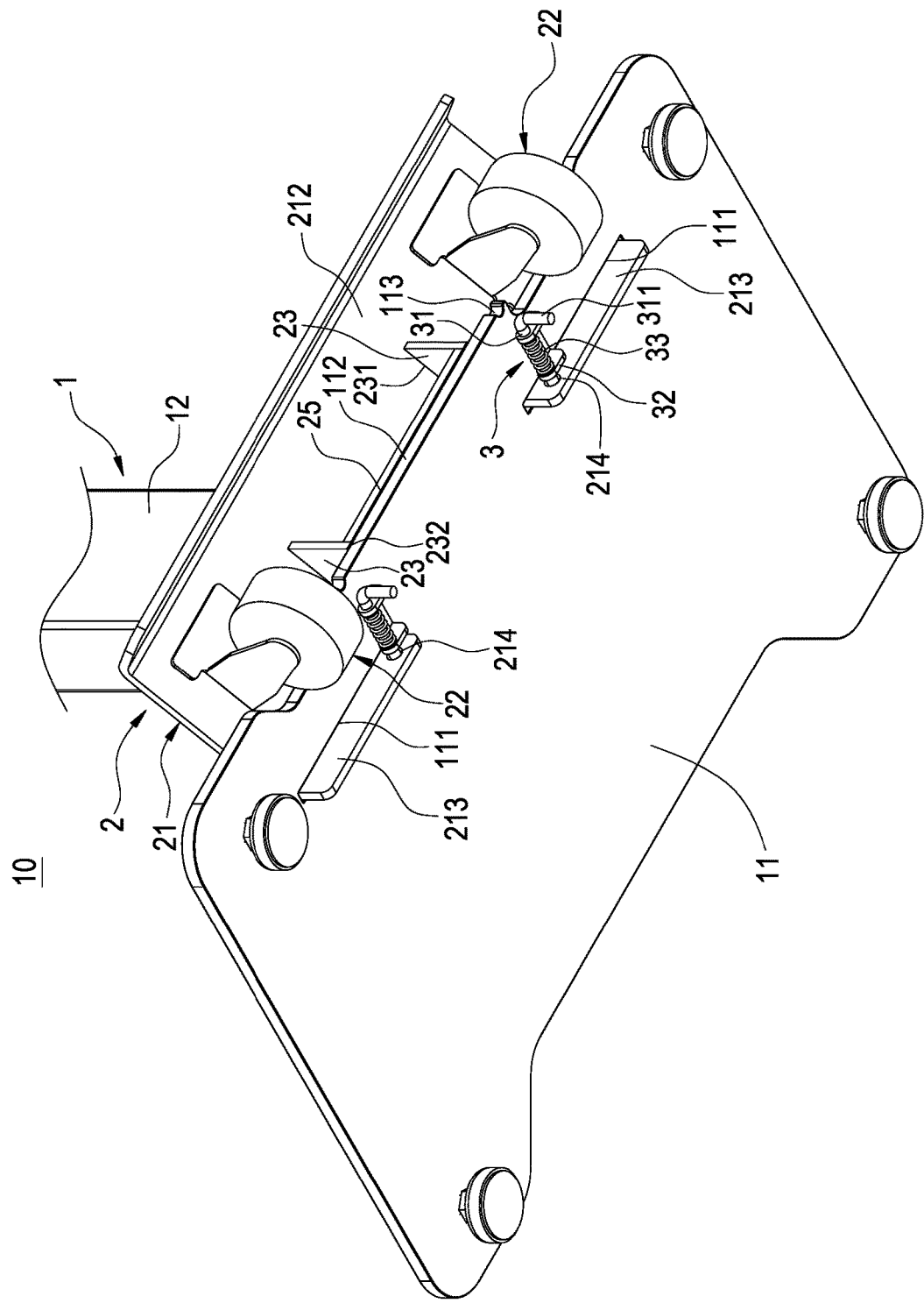
FIG. 9 is a partially assembled view of the support stand structure of the disclosure.
Figure 10:
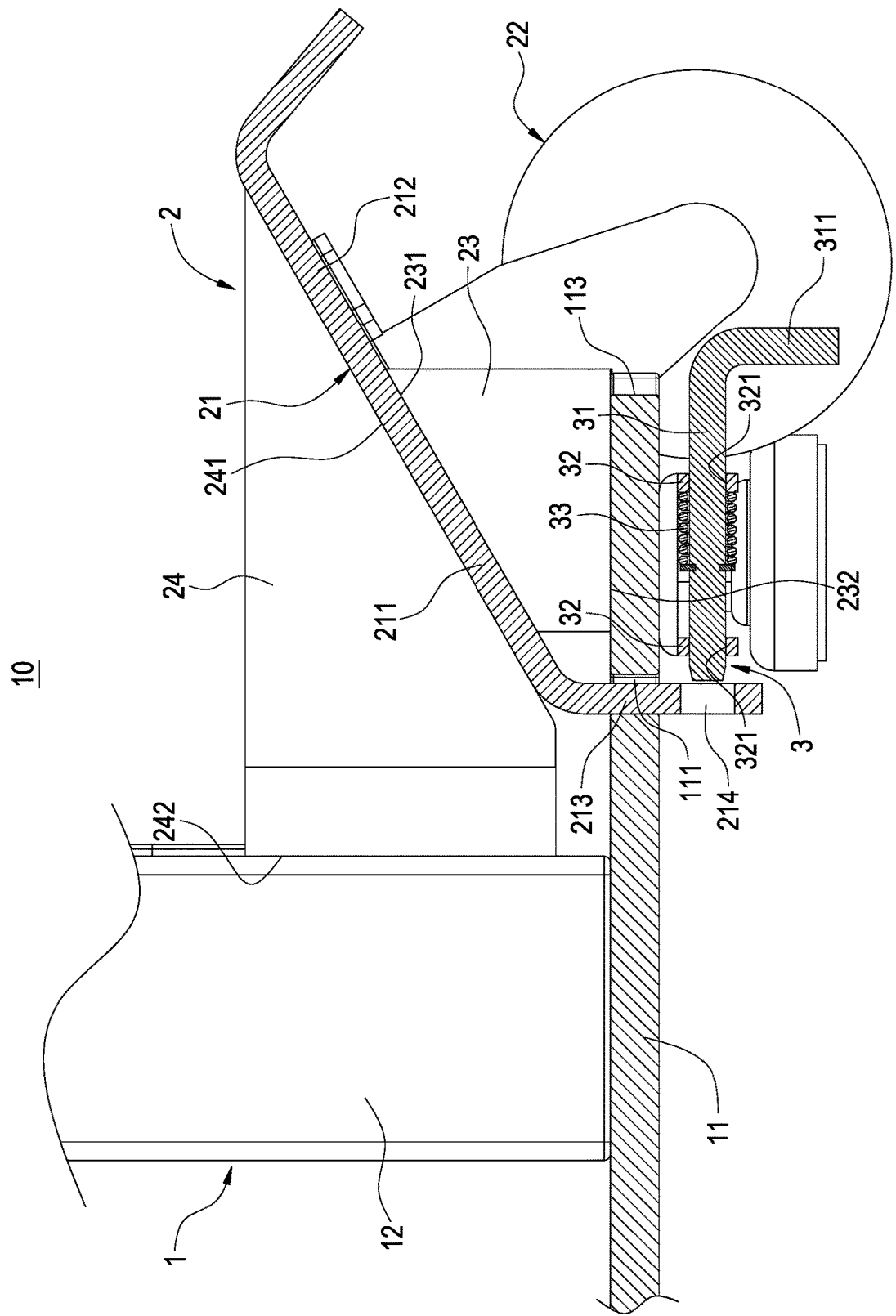
FIG. 10 is a partially cross-sectional assembled view of the support stand structure of the disclosure.
Figure 11:
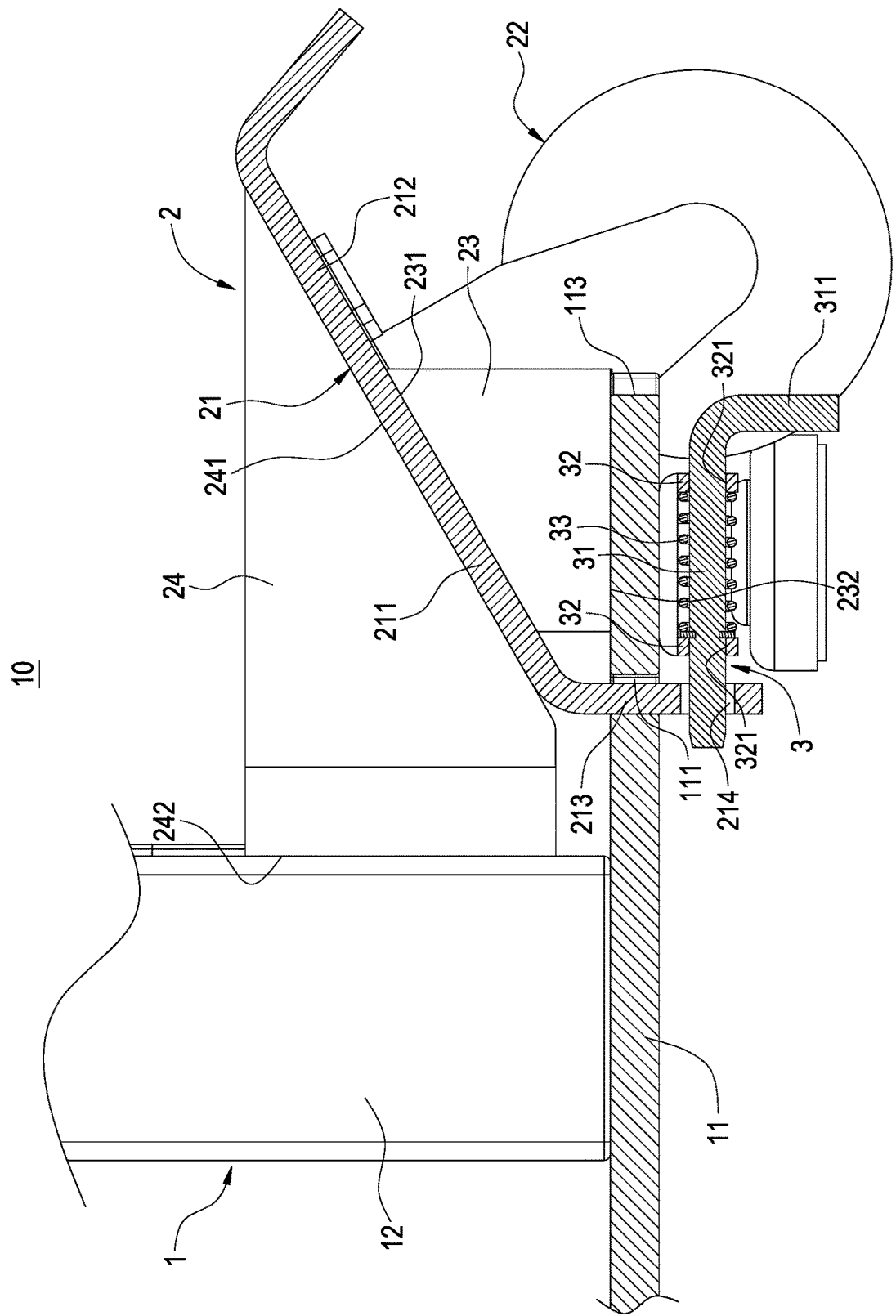
FIG. 11 is another partially cross-sectional assembled view of the support stand structure of the disclosure.
Figure 12:
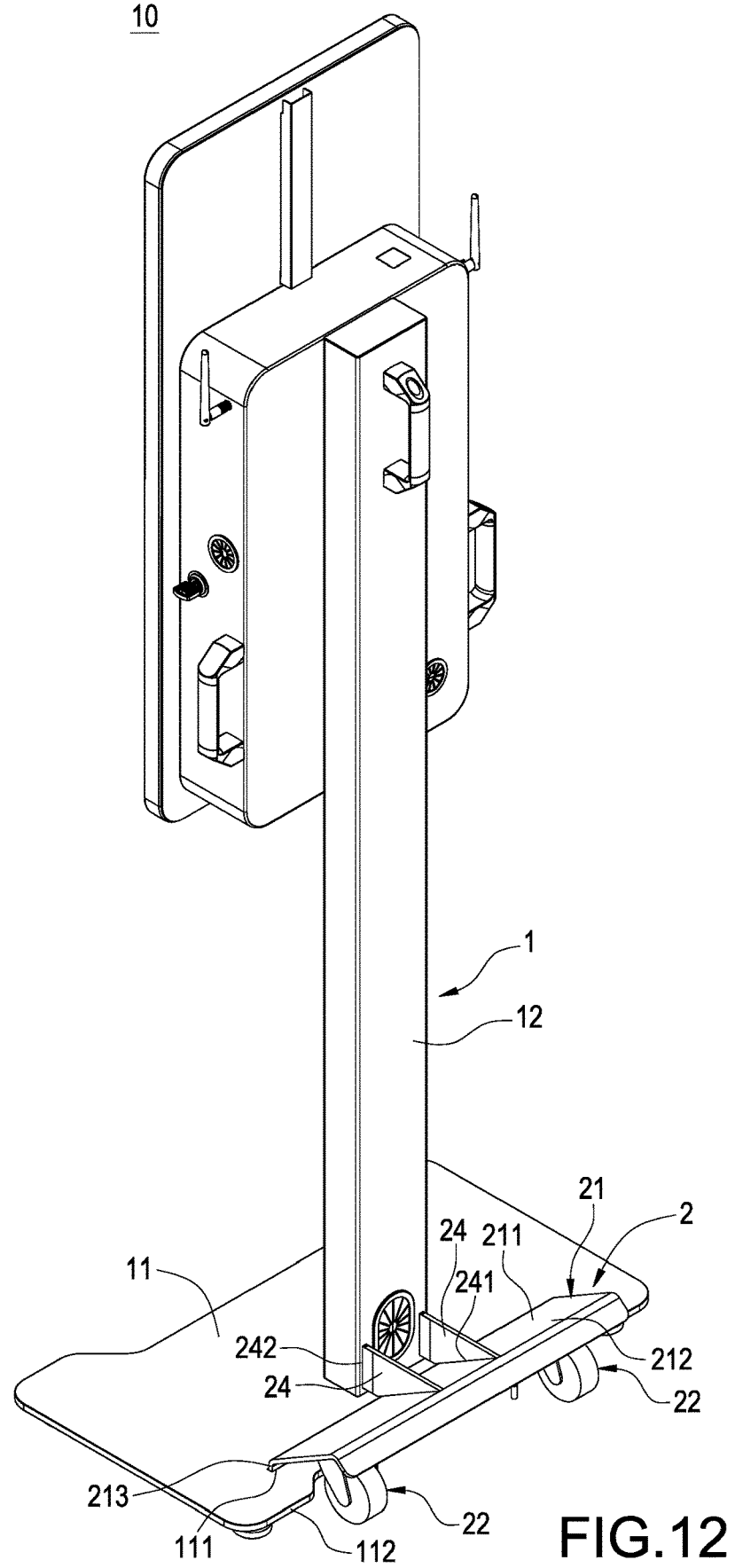
FIG. 12 is a perspective assembled view of the support stand structure of the disclosure.

As shown in FIGS. 6-12, those figures show the support stand structure 10 of the disclosure in a using status. First, as shown in FIGS. 6-8, each L-shaped lever 311 is detached from each indent 113, and then the L-shaped levers 311 is pulled toward the rear wall 112 to bring each movable pin 31 to move away from each indent 111. As shown in FIGS. 9-11, each tab 213 is inserted into each slot 111, and then each L-shaped lever 311 is released, the elastic members 33 may bring each movable pin 31 to move toward each slot 111 and to be inserted into each through hole 214. That is, the detachable wheeled seat 2 is firmly mounted on the base 11 and the wheels 22 are arranged on the rear wall 112 to make the stand 1 movable through the wheels 22.

Accordingly, when a user pulls each L-shaped lever 311 toward the rear wall 112 to make each movable pin 31 detach from each through hole 214 and then make each tab 213 detach from each slot 111, the detachable wheeled seat 2 may be rapidly removed from the base 11. Thus, the support stand structure 10 may have the functions of the wheels 22 being easily and rapidly to be assembled for rapidly moving the device.

In addition, the detachable wheeled seat 2 may be installed when the stand 1 needs to be moved and the detachable wheeled seat 2 may be removed when the stand 1 needs to be positioned. Therefore, the support stand structure 10 has the advantages of stable positioning and saving space with the detachable wheels 22.

Furthermore, the lower blocks 23 are sandwiched between the base 11 and the front plate 211 and the upper blocks 24 are sandwiched between the post 12 and the board 21 to make the board 21 slant with respect to the base 11 and the post 12. The stand 1 inclines toward the rear wall 112 when the stand 1 needs to be moved so as to smoothly move the stand 1 with respect to the board 21 and the wheels 22 as a fulcrum. Thus, the support stand structure 10 has the advantage of a stand 1 being easily to be moved.

It will be appreciated by persons skilled in the art that the above embodiments have been described by way of example only and not in any limitative sense, and that various alterations and modifications are possible without departure from the scope of the disclosure as defined by the appended claims.

What is claimed is:

1. A support stand structure with a quick-release wheel mechanism, the support stand structure comprising:
   a stand, comprising a base, and the base comprising a plurality of slots and a rear wall;
   a detachable wheeled seat, comprising a board and a plurality of wheels, the board comprising a front plate disposed above the base and a rear plate projecting over the rear wall, the front plate comprising a plurality of tabs extended downwardly and inserted in each slot, each tab comprising a through hole, and the plurality of wheels mounted on a bottom of the rear plate; and
   a plurality of fasteners, installed on a bottom of the base, each fastener comprising a movable pin, and each movable pin being attachable to and detachable from each through hole.

2. The support stand structure with the quick-release wheel mechanism of claim 1, wherein the board comprises at least one lower block extended downwardly, the at least one lower block is sandwiched between the base and the front plate.

3. The support stand structure with the quick-release wheel mechanism of claim 2, wherein the at least one lower block comprises a first slant edge and a first horizontal edge arranged correspondingly, the first slant edge is disposed on the front plate, and the first horizontal edge abuts against the base to slant the board with respect to the base.

4. The support stand structure with the quick-release wheel mechanism of claim 3, wherein the at least one lower block comprises a triangular block or a trapezoidal block.

5. The support stand structure with the quick-release wheel mechanism of claim 3, wherein an amount of the lower block is multiple, the support stand structure further comprises a transversal rib extended between sides of adjacent two of the lower blocks away from the board, and a bottom surface of the transversal rib and each first horizontal edge are coplanar and jointly abut against the base.

6. The support stand structure with the quick-release wheel mechanism of claim 1, wherein the stand further comprises a post mounted on a top of the base, the board comprises at least one upper block extended upwardly, and the at least one upper block is sandwiched between the post and the board.

7. The support stand structure with the quick-release wheel mechanism of claim 6, wherein the at least one upper block comprises a second slant edge and a second horizontal edge arranged correspondingly, the second slant edge is disposed on the front plate and the second horizontal edge abuts against the post to slant the board with respect to the post.

8. The support stand structure with the quick-release wheel mechanism of claim 7, wherein the at least one upper block comprises a triangular block or a trapezoidal block.

9. The support stand structure with the quick-release wheel mechanism of claim 1, wherein each fastener further comprises two positioning blocks and an elastic member, the two positioning blocks are extended from the bottom of the base and are arranged between each slot and the rear wall, each positioning block comprises a passing hole, each movable pin is inserted in the passing holes of the two positioning blocks, and each elastic member is clipped and elastically supports between each movable pin and one of the positioning blocks.

10. The support stand structure with the quick-release wheel mechanism of claim 9, wherein an L-shaped lever is disposed on an end of each movable pin away from each slot, the rear wall comprises a plurality of indents, and each L-shaped lever is attachable to and detachable from each indent.

\* \* \* \* \*